May 11, 1965 R. F. KOLEC ETAL 3,182,342
METHOD AND DIE SET FOR FORMING SOCKET HEADS
Filed Oct. 9, 1961
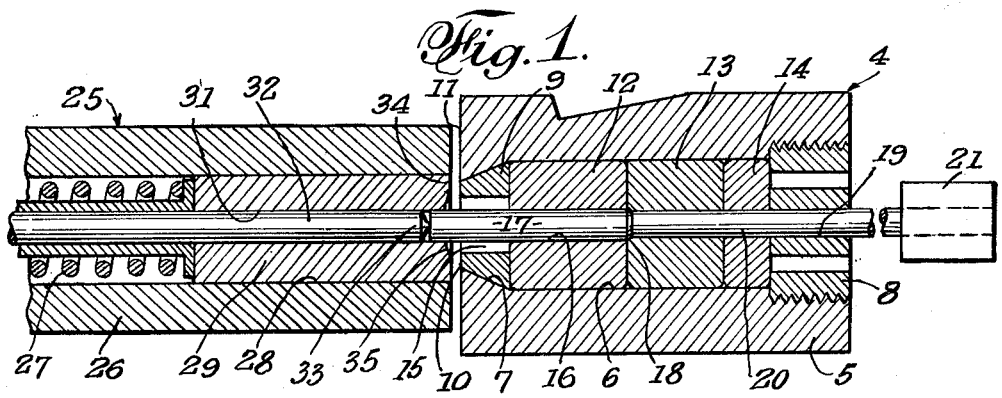
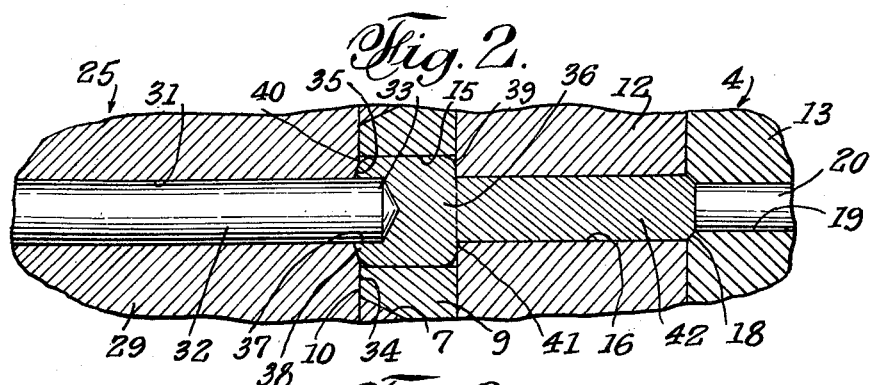
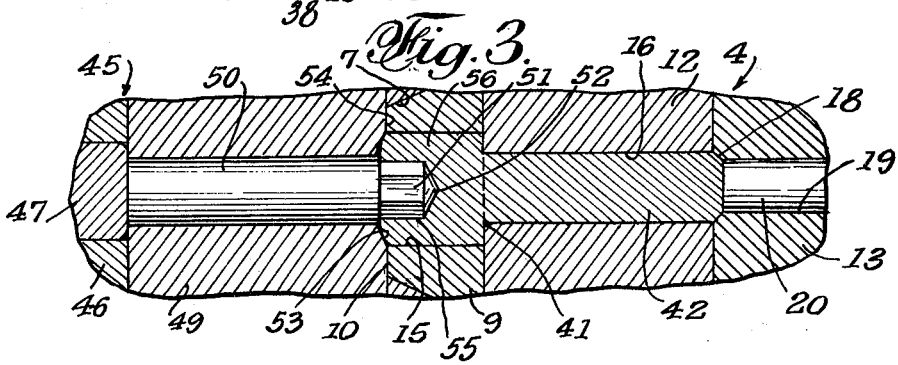
INVENTORS
ROBERT F. KOLEC
EUGENE F. DEAN
BY C. G. Stratton
ATTORNEY 3,182,342
METHOD AND DIE SET FOR FORMING SOCKET HEADS
Robert F. Kolec, Whittier, and Eugene F. Dean, Downey, Calif., assignors to Olympic Screw & Rivet Corporation, Downey, Calif., a corporation of California
Filed Oct. 9, 1961, Ser. No. 143,723
2 Claims. (Cl. 10—7)

This invention relates to a method for forming socket heads, particularly Allen heads and the like for cap screws, set screws, etc., and to a die set for carrying out said method.

In the manufacture of socketed screws by the cold-forming method, the industry has been unable to produce such items, of desired accuracy and free of burrs, with fewer than four punch-and-die blows. Such four-blow methods, while substantially more rapid than earlier methods in which the forming steps were interrupted by one or more annealing steps, nevertheless were only as facile to carry out as limited by the time involved in using four blows, even if the same could be practiced in a single machine.

Screws and rivets with flat, round, button and similar heads have, advantageously, been produced by a two-blow method, usually in a two-blow header of the type that performs two successive operations on a piece of stock by successive reciprocative blows. Such solid-die headers are well known in screw and rivet manufacturing and are produced by Waterbury-Farrell and National Machinery.

Since a substantial mass of metal is displaced from the round stock when a socket head screw is formed, the industry has not, heretofore, come forth with a solution in which upsetting and head-forming control are of such accuracy and uniformity that firm specifications in sizes, tolerances and metallurgical characteristics are achieved. Some prior screw-producing methods formed the sockets in the heads by separate broaching operations. Others, as in Patent No. 2,093,646, performed a minimum of four operations, using two separate dies and four different punches.

The present invention contemplates and has an object the provision of a method in which, after a wire slug has been cut from wire or rod stock, said slug is acted on twice while remaining in a socketing die to transform said slug into a socketed screw blank that may later be provided with threads in any conventional manner. Simply stated, an object of the invention is to provide a two-blow method for forming a socketed screw blank from a wire or rod slug.

Another object of the invention is to provide a two-blow method, as above contemplated, in which the end of the slug that is to be transformed into a socketed head is wholly enclosed during first-blow upsetting, although partly extending from the die cavity in which forming takes place, to insure upsetting control that provides for accuracy of the head form when ultimately finished by the second blow.

Another object of the invention is to provide a method as above characterized in which the second blow finish-forms the face of the head simultaneously with final forming during the second blow.

A still further object of the invention is to provide a novel die set for carrying out the method of the present invention.

This invention also has for its objects to provide a novel, economical and convenient method or process of superior utility, and to provide apparatus that is positive in operation, convenient in use, easily installed in working position and easily disconnected therefrom, economical of manufacture, relatively simple, and of general superiority and serviceability.

The invention also contemplates novel combinations of method steps as well as novel details of construction and novel combinations and arrangements of parts, which will appear more fully in the course of the following description, which is based on the accompanying drawing. However, said drawing merely shows and the following description merely describes, the invention with respect to a preferred method and apparatus, the same, nevertheless, being given by way of illustration or example only.

In the drawing, like reference characters designate similar parts in the several views.

FIG. 1 is a longitudinal sectional view of an upset punch and a cooperating die, showing a cylindrical slug of metal positioned in the die preparatory to the first or upset step of forming a screw blank according to the invention.

FIG. 2, to an enlarged scale, is a fragmentary sectional view of said punch and die performing the upset operation by means of the first blow.

FIG. 3 is a similar view of a forming punch engaged with the die of FIGS. 1 and 2 and performing the second operation by means of the second blow.

It will be understood that a two-blow header will provide for a side-by-side disposition of the two punches illustrated and will provide for so mounting the die that the same is moved alternately into operative engagement with said punches, the successive blows occurring in rapid succession, usually in a fraction of a second. As previously mentioned, a Waterbury-Farrell or National Machinery header may mount said dies for such two operative blows. The mentioned patent illustrates such a machine.

The die 4 is shown as comprising a die sleeve 5 having a bore 6 that preferably has an end conical restriction 7 at the operating end of the die and a plug 8 closing the other end of the bore 6 and preferably threadedly engaged with said sleeve 5. A conical cap die 9 is fitted into the conical bore restriction to have its outer smaller face 10 flush with the face 11 of the die sleeve 5. Said cap die 9 is held in operative position by plug 8, a body die 12, a point die 13, and a spacer 14.

It will be clear that the elements 9, 12, 13 and 14 may vary in size, particularly in length, depending on the length of the screw shank desired for the cap screw blank that is formed. The cap die 9 is formed as a ring with a central opening 15 that is cylindrical and of a diametral size desired for the cap or head of the finished screw blank. The thickness of said cap die gauges the height of the final-formed cap or head. The body die 12 has a central bore 16 of a size to slidingly receive a slug 17 so that the same is accurately coaxial with the axis of cap die opening 15. The point die 13 is provided with a chamfer 18 of a size to seat a bevel on said slug 17 when the same is severed from the rod stock, as above explained. It will be seen from FIG. 1 that the insertion of slug 17 into the body die is limited by said chamfer 18 and the same exactly locates the outer end of said slug with relation to the cap die 9. As can be seen in FIG. 1, the end of slug 17 extends beyond the die face 10, and the mass of the metal of such extension from the face of the body die 12 is slightly less than the volume of space within the cap die opening 15. The reason for this proportion of slug projection and cap die opening is that, as will later be seen, the finished cap is entirely formed of said end of the slug and, the same having a socket therein, the mass of the finished head will be smaller than said volume of the cap die opening or space 15.

The point die and spacer, as well as the plug, have a common bore 19 into which extends a knockout pin 20, the end of which ejects the finished screw blank. A knockout pin button 21 controls operation of pin 20 in the usual way.

The above-described die 4 is first operatively engaged by an upset punch 25 which is shown as comprising a holder 26 that is formed with a longitudinal bore 28. A hardened insert 29 is fitted into the operating end of said bore and is fixedly held in place by any suitable means. Said insert has a through bore 31 in which is fitted an upset pin 32 which, in this case, has a conical-ended projection 33 that is normally retracted into the bore 31. A shallow conical recess 35 is formed in the end face 34 of the insert.

The upset pin 32 extends rearwardly from the insert 29 and its rearward end, in the usual way, is backed up by the ram that carries the punch 25. However, said punch is longitudinally movable, a spring 27 biasing the same to operative position.

According to the present method, the above-described die 4 and punch 25 carry out the upsetting step of the method in which said die and punch cooperate to simultaneously pre-form the cap or head of the screw and form therein an initial socket while the preformation of the cap is so effectively controlled as to prevent uneven spreading or mushrooming of the cap and the formation of burrs, particularly around the outer edge of the cap.

In practice, the die 4 has a fixed position, the only part thereof that moves being the knockout pin 20 that is retracted by an incoming slug 17, and is projected to dislodge a finished screw blank by actuation of the button 21. The upset punch 25 is carried by a usual punch ram and is longitudinally movable bodily, by the ram, toward the die 4 to achieve contact between the die face 10 and the insert face 34, thereby closing the die cavity 15. FIG. 1 shows an approach to this position, wherein the extending end of a slug 17 in the die enters the bore 31 of insert 29 and, in the process, retracts the upset pin 32, since, at this time, the pin is loose or floating in said bore 31.

After the holder 26 and insert 29 reach the cavity-closing position shown in FIG. 2, the ram, by continuing its movement, acts as a back-up for the outer end of pin 32 and projects the conical end 33. During this first blow, said end 33, by impingement on the slug end, acts as a center punch retaining accurate alignment of punch and slug as said projecting end of the slug is upset into the central opening or cavity 15 of the cap die 9, as closed by the upset insert 29.

The length of the slug is predetermined so that the finished cap of the screw will be fully formed and yet leave no excess that would not fit within the opening 15. The closing movement of the punch pin 32 will result, first, in the pre-formed cap 36 spreading to the full diametral size of said opening while a pre-formed socket 37 is formed in said cap, and, then, in a filling of the recess 35 of the punch holder 29 to provide said cap with an outer conical bulge 38 that is a complement of said recess.

It will be evident that the normal spreading of the slug by punch end 33, while causing the pre-formed cap 36 to fill the cap die 9, would ordinarily cause the metal at the end of said cap either to be skimpy and not fully completing the cap end, or too full and overspilling the die cavity and forming a ring burr. The present method obviates either of these undesired conditions from occurring. The method insures that the punch insert face 34, particularly the recess 35 thereof closing the die cavity, has full contact with the outer end of the pre-formed cap 36 and while maintaining said contact, draws the cap metal inwardly by reason of the conical form thereof. As a result, the pre-formed cap 36 will be complete as to its outer cylindrical face and the same will have the completely formed conical end bulge 38. Since it would be quite difficult to form a pre-formed cap 36 as above and yet fully fill the die cavity 15, the method contemplates that the opposite circular edges 39 and 40 of the pre-formed cap will be well rounded or otherwise beveled or chamfered, although the inside corner 41 where the cap joins the screw shank portion 42 is formed sharp.

It will be noted that the insert 29 first encloses the die cavity but does not in any way act on the slug since the latter merely enters the bore 31 of said insert as the punch 25 is engaged with the die. Only after the die cavity 15 is completely enclosed does the punch pin 32 act to forge the screw cap 36, as above described. Finally, the insert face 34 and its conical recess 35 do not come into contact with said cap to form the bulge 38 thereon until the terminal portion of projection of pin 32.

From the foregoing, it will be evident that the pre-formed cap 36 is smooth and uniformly and symmetrically formed on all its outer faces. It will also be seen that the punch end 33 forms the socket 37 without burrs since the cap bulge 38 completely fills in the annular acute-angled recess that is formed by the conical face 35 and the punch end 33. Thus, the first step of the method admirably prepares the screw for completion by the final-forming step, which is carried out in immediate sequence, to obviate change in the character of the pre-formed metal, by separating the die 4 from the punch 25, leaving the pre-formed screw in the former, axially aligning the die 4 with a finish-forming punch 45 and, then, immediately moving them together in the second blow of the method.

The punch 45 has a hammer sleeve 46 with a backup plug 47, and is fitted with a punch holder 49 that carries therein a forming punch 50 in the same manner that the punch 25 carries its upsetting punch 32. Said forming punch 50 is provided with a polygonal projection 51, in this case, hexagonal, the same having a conical tip 52. A concave recess 53 is formed in the end face 54 of the punch holder 49, this recess being transversely formed according to the partly-flattened end form desired for the finished cap.

At the second blow, the projection 51 fully forms the socket 55, and the face of recess 53 fully forms the finished cap 56, completely filling in the previously rounded corners 39 and 40, as can be seen in FIG. 3. The punch 50 and its polygonal end 51 are at the furthest projected position with said end at its greatest penetration into the cap or head 56. Since said end 51 is shown as being larger (about half again longer) than the punch end 33, the same will enlarge the socket 37 to the size of the larger socket 55 by displacing the metal of the pre-formed head 36 into the spaces defined by the rounded edges 39 and 40, and by back flow against the concave recesses 53. Also, the metal forced against the concavity is drawn thereby inwardly toward the punch 51. The cap 56 is now fully and completely formed with no burrs since there is no outward spreading of metal but, rather, an inward metal flow as during the first blow.

When the die 4 and punch 45 are now separated the knock-out pin 19 is now projected to eject the finished screw blank which, when provided with a thread on its shank 42, is completely finished and ready for use.

While the foregoing illustrates and describes what is now contemplated to be the best mode of carrying out the invention with respect to both the method and apparatus, the same is, of course, subject to modification without departing from the spirit and scope of the invention. Therefore, it is not desired to restrict the invention to the particular method steps or combination or sequence of steps described, nor to the particular form of construction illustrated and described, but to cover all equivalents or modifications of method and apparatus that may fall within the scope of the appended claims.

Having thus described the invention, what is claimed and desired to be secured by Letters Patent is:

1. A three-part die set for use in a two-blow header that comprises:

(a) a die having a head-forming cavity and provided with a longitudinal bore to hold a cylindrical metal slug with an end thereof extending through and partly beyond the open end of said cavity, (b) an upsetting punch movable to close said cavity and provided with a socket-forming upset pin to deform the mentioned end of the slug to the shape of a preformed head that partly fills the die cavity, and has a socket in its end, said punch having an end face with a conical seat that directs the flow of the metal of the pre-formed head to form a conical bulge in the outer face thereof; and (c) a finish-forming punch engaged with said die after the upsetting punch is sepaarted from the die and while the slug with its pre-formed head remains in the die, (d) said finish-forming punch having a concave seat in the face thereof directed toward the die cavity to partly flatten said bulge in the outer face of the pre-formed head, and (e) a polygonal socket-forming end of greater size than said socket-forming upset pin fixedly projecting from the finish-forming punch beyond the concave seat therein and which enters and finish-forms the socket in the head and further displaces the metal of the preformed head to fill the die cavity.

2. The method of forming a burr-free socketed head on a metal slug that consists in:

(a) placing such a slug in a die having a head-forming cavity so that a portion of said slug extends through and beyond the open end of said cavity with the mass of said slug, from the bottom of the die cavity to the end of the slug, substantially equal to or slightly less than the mass of the burr-free head to be formed, (b) engaging a punch having a cavity-enclosing recessed face with the open end of the die to enclose the same with the end of the slug extending into an axial bore in said punch.

(c) initially upsetting the portion of the slug that extends from the bottom of the die cavity into said bore to partly form said slug portion into a head that has an outer face with a socket therein smaller than the finished size of the socket in the head to be formed, (d) while the metal of the outer portion of the head is directed by the recessed face of the punch in a flow that forms a conical bulge in the outer portion of the head with said bulge extending beyond the outer end of the die cavity, (e) opening the die and while the partly-formed head remains in the die cavity and before the metal of the initially-formed socketed head permanently changes its character, engaging a complete-forming punch having a die-enclosing face to engage the open end of the die cavity to close the same, and simultaneously complete-forming said initially-formed head by enlarging its initially-smaller socket to its larger completed form and size, thereby causing a displacement flow of the metal of the partly-formed head toward the cavity-enclosing walls of both the die and the complete-forming punch to form the head to a size substantially filling the die cavity, and (f) confining the mentioned bulge of the head while partly flattening the same during complete-forming thereof.

References Cited by the Examiner

UNITED STATES PATENTS

| 1,618,446 | 2/27 | Kuhne. |
| 1,933,737 | 11/33 | Kaufman _____ 10—27 |
| 1,978,372 | 10/34 | Purtell. |
| 2,093,646 | 9/37 | Purtell. |
| 2,261,067 | 10/41 | Lovisek. |
| 2,953,794 | 9/60 | Klooz. |

FOREIGN PATENTS

| 735,243 | 5/43 | Germany. |
| 921,907 | 12/54 | Germany. |

ANDREW R. JUHASZ, *Primary Examiner.*

WILLIAM W. DYER, JR., *Examiner.*